Sept. 7, 1965
T. M. DONAHUE
3,205,436
METHOD AND APPARATUS FOR MEASURING IMPEDANCE INCREASES
IN THE GROUND OR PROTECTIVE GROUND WIRES LEADING TO
THREE-WIRE PRONG POWER RECEPTACLES
Filed Feb. 2, 1962
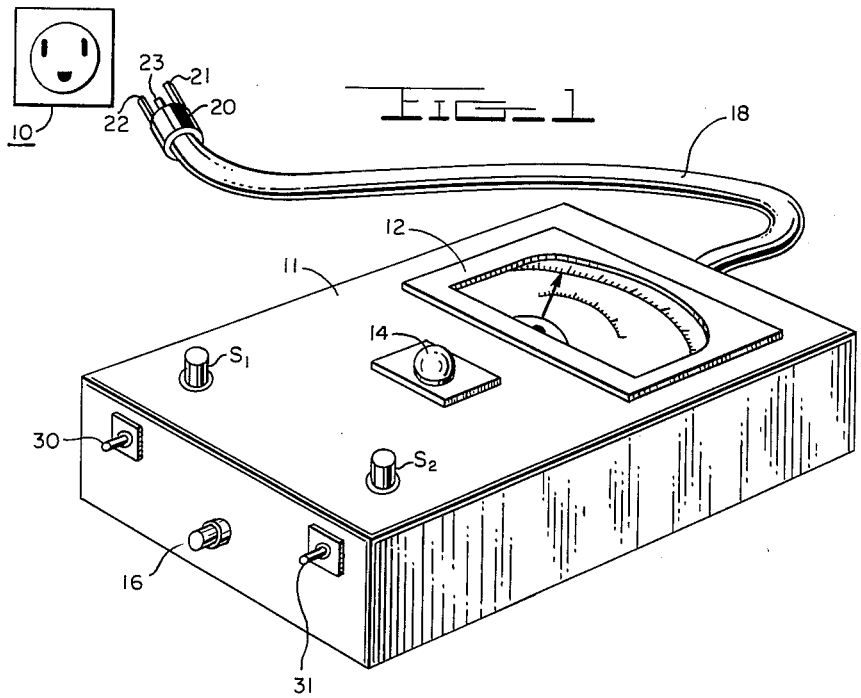
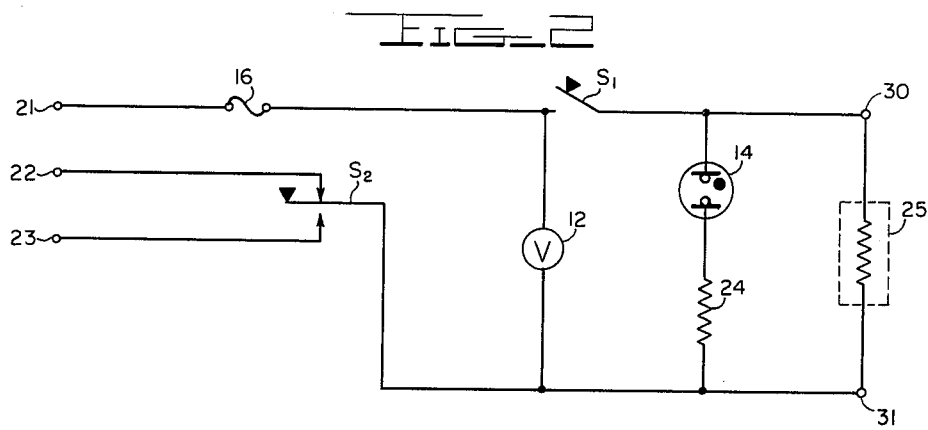
INVENTOR
THOMAS M. DONAHUE

United States Patent Office 3,205,436
Patented Sept. 7, 1965

3,205,436
METHOD AND APPARATUS FOR MEASURING IMPEDANCE INCREASES IN THE GROUND OR PROTECTIVE GROUND WIRES LEADING TO THREE-WIRE PRONG POWER RECEPTACLES
Thomas M. Donahue, 3342 Stephenson Place, NW., Washington 15, D.C.
Filed Feb. 2, 1962, Ser. No. 170,710
3 Claims. (Cl. 324—51)

This invention generally relates to an electrical testing device and more particularly to a power receptacle checking device and the method of evaluating the condition of the respective lines leading to the receptacle in order to determine whether or not the receptacle is in a safe operating condition.

Today, a large portion of the electrical appliances and tools that are available require a three-wire cord so as to afford a continuous low-resistance path to the system ground. The consequent danger of an appliance becoming electrically alive is multiplied as the operating voltage increases and as a result, it becomes of paramount importance that the appliances be properly grounded. However, when a three-wire cord is connected to a three-prong power receptacle, there is nothing to ensure that the receptacle is properly grounded. When there are six different ways in which it is possible to connect the three wires to three terminals, only one of which is correct, it should be appreciated that it becomes very probable for a receptacle to be incorrectly wired. If incorrectly wired, an appliance connected to the receptacle may work satisfactorily and the danger is not realized until an accident occurs. It also frequently happens that the continuous low resistance path to ground provided by the protective ground wire deteriorates to such an extent that several ohms of resistance are present. Such deterioration is generally incapable of being detected with presently existing receptacle checking equipment and as a result, a dangerous condition may be present which again is not realized until an accident occurs.

Accordingly, it is an object of this invention to provide a new and improved method and device for checking electrical power receptacles.

It is another object of this invention to provide a compact, unitary receptacle testing device which can perform an accurate and safe continuity check for 115 to 230 volt power distribution systems.

It is still a further feature of this invention to provide a current drawing instrument for indicating whether or not there is proper continuity at all the terminals of a power receptacle without disconnecting or dismantling any part thereof.

Yet another object of this invention is to provide a direct-reading instrument that can perform a rapid, fast but reliable voltage check of a three-wire distribution system and to accurately register any impedance increase that may occur in the ground or protective ground wires.

A further feature is to provide a portable electrical testing device simple in construction which can be manufactured at small expense that is particularly adaptable for use in accurately checking ordinary home or office three-wire power receptacle outlets.

The present invention provides a means for checking and evaluating the condition of the wiring in a grounding type A.C. receptacle by a unique method of drawing current through a power resistor and measuring any voltage drop on an expanded scale A.C. voltmeter while performing the usual evaluating and checking test with a circuit employing a neon light.

Other objects and advantages of the invention will hereinafter become more fully apparent from the following description of the annexed drawings, which illustrates a preferred embodiment, and wherein:

FIGURE 1 is a perspective view of an electrical receptacle testing device embodying the features of the present invention and by means of which methods embodying the invention may be practiced;

FIGURE 2 is a schematic diagram of the testing circuit for checking and evaluating the condition of a grounding type A.C. receptacle.

Referring now to the drawings, wherein like reference characters designate like or corresponding parts throughout the several views, in FIG. 1 there is shown an electrical receptacle checker used for checking and evaluating the condition of power receptacle output 10. The receptacle checker is enclosed in a casing 11 which may be of any configuration that can conveniently house the circuit shown in FIG. 2. Preferably, the casing is rectangular for ease of handling. Exposed at the upper end of the case, is an A.C. voltmeter 12 whose scale has been expanded to accentuate the 90 to 120 volt range or the 210 to 230 volt range if a higher range is required. At the opposite end of the casing are pushbutton type switches SPST $S_1$ and DPST $S_2$. It should be appreciated that other types of switching means can be used in place of $S_1$ and $S_2$. Also enclosed by the casing 11 is a neon light 14, a fuse 16 and external connecting terminals 30 and 31. In order to provide maneuverability and to connect electrical testing instrument to the power receptacle outlet 10, a flexible three-wire power cord 18 is provided, terminating at plug 20. Plug 20 is a three-prong male connector type end having a hot conductor lead 21, a neutral or ground conductor lead 22 and a protective ground conductor lead 23.

Within the casing 11 is a current drawing power resistor 25 coupled between external connecting terminals 30 and 31 and a current limiting resistor 24 which couples one end of the neon light to a common junction point at switch $S_2$.

The electrical connections within the casing 11 are shown in FIG. 2. Here, the hot conductor 21 is connected through a fuse 16 to one terminal of switch $S_1$ and to one end of expanded scale voltmeter 12. The other terminal of switch $S_1$ is coupled through a parallel path of neon light 14 and resistor 24 in one branch and current drawing resistor 25 in the other branch, to the other end of voltmeter 12 and then in turn to the single throw terminal of switch $S_2$. Switch $S_2$ is then wired so as to connect to either the neutral or ground conductor 22 or the protective ground conductor 23. External connecting terminals 30 and 31 are provided so that the value of current drawing power resistor 25 can be varied by adding additional resistance in parallel if it is desirable to measure power distribution system of a different power rating.

In operation, when checking a power receptacle outlet and assuming that switches $S_1$ and $S_2$ are in their respective positions as shown in FIG. 2, the male plug 20 is connected to the receptacle outlet, such as 10. This will measure the line position by measuring A.C. line voltage between the hot conductor 21 and the neutral conductor 22 without a load indicating whether or not there is power supplied to the receptacle outlet.

Now by depressing switch $S_1$, the A.C. load line voltage between hot conductor 21 and neutral or ground conductor 22 can be measured. Neon light 14 will glow, indicating that there is voltage across its terminals and that a large current is being drawn. The load resistor 25 should draw a significantly large current and if the A.C. line is in good condition no change will occur in voltmeter 12. However, should the line be defective, a drop in the voltage will be recorded on the voltmeter scale. Switch $S_1$ can be spring-loaded so as to be closed only when forcibly being depressed. Next, only switch $S_2$ is depressed, which allows the tester 11 to measure the A.C. line voltage between the hot conductor 21 and the protective ground conductor 23. The voltmeter, if the protective ground conductor 23 is in proper condition, should register the same as before when switch S1 was depressed. This indicates that ground is present, but as with prior receptacle checkers, this does not indicate how good the continuity is. Finally, both switch $S_1$ and switch $S_2$ are depressed simultaneously. This will cause a large current to be drawn by load 25 and since the protective ground conductor 23 is in series with the load, any resistance at all, even a fraction of an ohm, will cause an appreciable drop on the expanded scale of the voltmeter. The voltmeter scale can be calibrated so as to drop at a set rate for each ohm of resistance. Thus, the exact amount of impedance in the protective ground circuit can be directly determined, whereas without the voltmeter scale the neon light 14 will still be glowing, indicating a good protective ground conductor since the neon light is incapable of properly indicating a small change in continuity of conductors 23 due to the minute change in current.

It should also be appreciated that a reactance impedance could be substituted for the resistance 25. It is also contemplated that this instrument could employ numerous interchangeable adapter plugs for male plug 20 in order to check and evaluate the numerous style receptacle outlet plugs that are currently available.

Obviously many modifications and variations of the present invention are possible in the light of the above teachings. It is therefore to be understood that within the scope of the appended claims, the invention may be practiced otherwise than as specifically described without departing from the spirit and scope of the invention.

What is claimed is:
1. The method of checking grounded type A.C. power receptacles in order to determine whether or not there is proper continuity at all the terminals of a power receptacle, comprising the steps of measuring the voltage across the hot and neutral terminals of the power receptacle, inserting a load across the hot and neutral terminals, inserting a visual voltage-actuated means across the hot and neutral terminals, measuring the voltage across the hot and neutral terminals with the load and visual voltage-actuated means connected across the hot and neutral terminals, disconnecting the load and visual voltage-actuated means, measuring the voltage across the hot and protective ground terminals, inserting the load and visual voltage-actuated means across the hot and protective ground conductors, and measuring the voltage across the hot and protective ground terminals.

2. Apparatus for treating alternating-current receptacles of the type including power line, neutral and protective ground terminals, comprising
 plug means including line, neutral and protective ground contacts adapted for electrical engagement with the line, neutral and protective ground terminals of the receptacle, respectively;
 a voltmeter having first and second terminals;
 a neon light;
 a current limiting resistor connected in series with said neon light to define a series branch;
 an impedance load connected across the ends of said series branch to define a parallel network;
 means including a normally open first manual switch operable to connect said parallel network across the first and second terminals of said voltmeter;
 first conductor means connecting the first terminal of said voltmeter with the line contact of said plug means;
 and means including a second manual switch for connecting the second terminal of said voltmeter alternately with the neutral and protective ground contacts of said plug means, respectively.

3. Apparatus as defined in claim 2 wherein said second switch comprises a double-pole single-throw switch normally connecting the second terminal of said voltmeter with the neutral contact of said plug means.

References Cited by the Examiner
UNITED STATES PATENTS

| | | | |
|---|---|---|---|
| 2,994,819 | 8/61 | Vincent | 324—51 |
| 2,997,701 | 8/61 | Costanzo | 340—255 |

FOREIGN PATENTS

| | | |
|---|---|---|
| 543,660 | 3/42 | Great Britain. |
| 807,544 | 1/59 | Great Britain. |
| 818,482 | 8/59 | Great Britain. |

WALTER L. CARLSON, *Primary Examiner.*